UNITED STATES PATENT OFFICE.

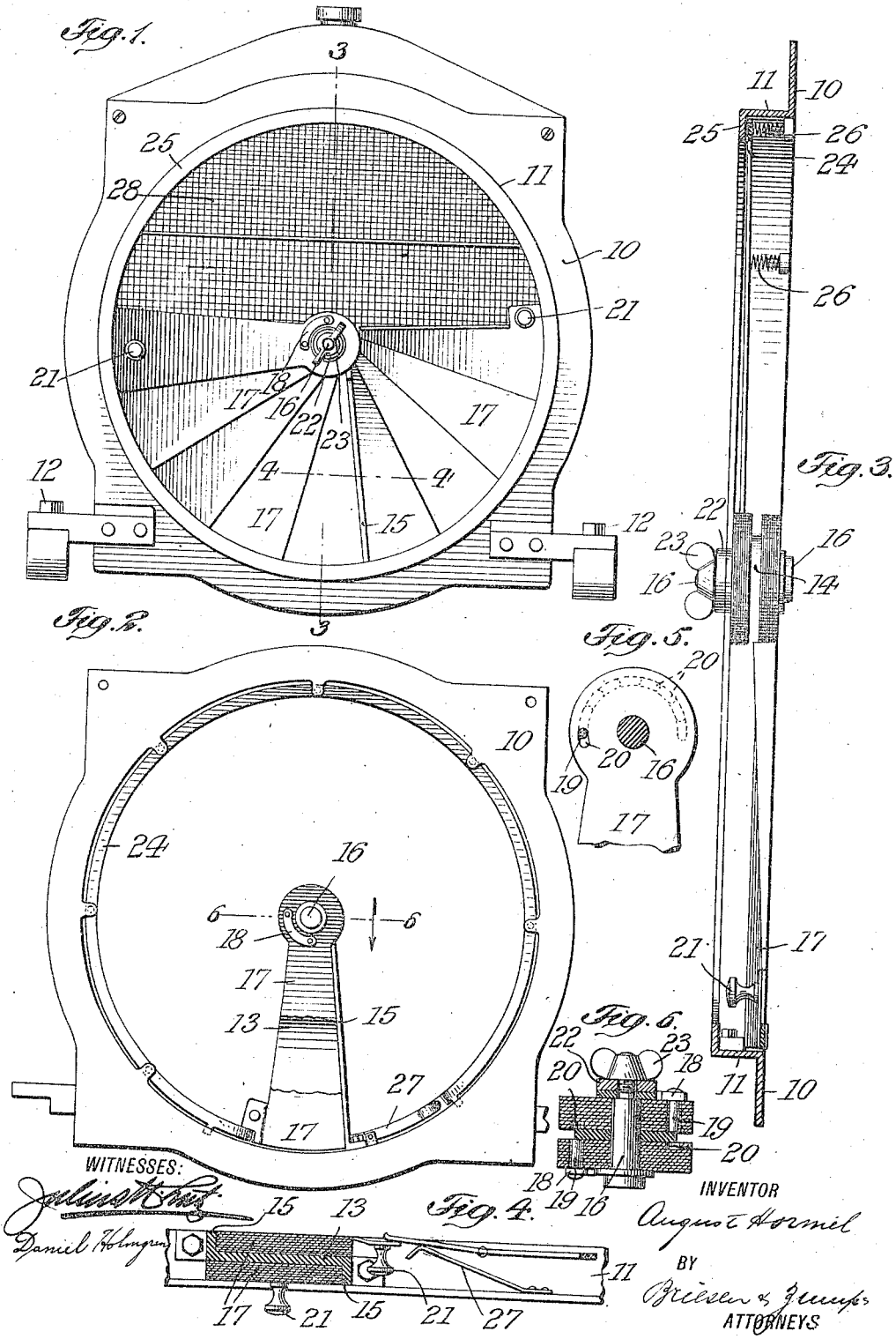

AUGUST HORMEL, OF NEW YORK, N. Y.

WIND-SHIELD FOR AUTOMOBILE-RADIATORS.

1,060,187.

Specification of Letters Patent.

Patented Apr. 29, 1913.

Application filed February 12, 1912. Serial No. 676,969.

*To all whom it may concern:*

Be it known that I, AUGUST HORMEL, a citizen of the United States, residing at New York city, county and State of New York, have invented a new and Improved Wind Shield for Automobile-Radiators, of which the following is a specification.

This invention relates to a wind shield of novel construction which permits the volume of air striking the front of an automobile radiator to be readily adjusted so that the device may be set in a handy manner to higher or lower wind pressure and temperature.

In the accompanying drawing: Figure 1 is a front elevation of a wind shield embodying my invention; Fig. 2 a rear view thereof with the blades folded and partly broken away; Fig. 3 an enlarged cross section on line 3—3, Fig. 1; Fig. 4 a section on line 4—4, Fig. 1 with the blades folded; Fig. 5 a detail of the blade-eye, and Fig. 6 a section on line 6—6, Fig. 2.

The device comprises essentially a frame 10 provided with an inner annular rim 11 that forms a circular opening through which the air is adapted to be admitted to the front of the radiator. Frame 10 may be mounted in suitable manner, the drawing showing it to be bolted to the chassis at 12. Into the opening of frame 10, there extends radially an arm 13 which is approximately sector-shaped and is arranged midway between the outer and inner limits of rim 11. Arm 13 is of flat form, has a central apertured eye 14 that constitutes a bearing, and is provided with a pair of approximately radial end flanges 15, extending in opposite directions (Fig. 4). Within eye 14 is seated a shaft or pintle 16 upon which are free to turn two groups of radially disposed blades 17, the blades of the two groups being respectively mounted backward and forward of arm 13. The form and size of each blade corresponds substantially to that of arm 13, each blade having flaring sides, and a central eye and receives shaft 16. The correlation of the parts is such that when the blades are opened, one of the groups thereof will close one half of frame 10, while the other group will close the other half, thus completely shutting off the wind. When the blades are folded, they will all accumulate on opposite sides of arm 13, so that the frame 10 is free to admit the maximum volume of air. Between these two extreme positions, any suitable adjustment can be selected, so that the volume of air admitted may be regulated to a nicety. In order to operate the blades, there is attached to the outermost blade of each group by means of a suitable member 18, an inwardly extending pin 19, that is arranged in parallelism with shaft 16. This pin passes through all of the blades pertaining to its group, for which purpose there is formed within the hubs of said blades a series of segmental slots 20 arranged concentric to shaft 16. These slots gradually increase in length from the blade next succeeding the outermost blade toward the innermost blade as indicated by dotted lines in Fig. 5. When the two outermost blades are drawn forward by means of knobs 21, pins 19 by engaging the perimeters of successive slots, will successively unfold the blades, the size of the slots being however such that the edges of the blades will always remain overlapped. In order to hold the blades in position after being set, shaft 16 is provided with a washer 22 and with a threaded end on which is fitted a winged nut 23 between which and the washer, the blades are adapted to be clamped.

Means are provided for so holding the outer ends of the blades against the body of the frame that any rattling of the blades is prevented. These means consist of a wire hoop 24 fitted into rim 11 and pressed toward a flange 25 of rim 11, by means of a suitable number of springs 26. The outer ends of the blades which when unfolded extend between hoop and flange, are by the hoop so spring-pressed against the latter that any vibrations of the blades are effectively checked.

In order to cause the blades to be unfolded in an orderly manner, uninfluenced by friction, there is secured to frame 10 at the right and left of arm 13, a spring keeper 27. Each of these keepers so checks the advance of the blades that before any one blade will be liberated, the preceding blade must have been unfolded to such an extent as to cause its engagement by pin 19.

In use the blades are successively unfolded or raised by means of the knobs 21 until the desired proper wind opening is formed opposite the screen 28 of the radiator. During this movement rattling is prevented by hoop 24, while nut 23 serves to hold the blades in the position after being set. When the device is to be folded, the blades are lowered by means of the knobs, until they are grouped on opposite sides of arm 13, the flanges 15 of which check the further movement of the blades after they have become alined within the arm.

I claim:

1. A device of the character described, comprising a frame adapted to be mounted in front of an automobile radiator and having an opening, a shaft centered within said opening, a plurality of foldable blades mounted on said shaft, the outer ends of such blades being adapted to bear against the frame, and means for holding the blades in their unfolded position.

2. A device of the character described, comprising a frame adapted to be mounted in front of an automobile radiator and having an opening and a flanged rim extending around said opening, a shaft centered within the opening, a plurality of foldable blades mounted on said shaft, the outer ends of said blades being adapted to engage the flanged rim of the frame, and means for holding the blades in their unfolded position.

3. A device of the character described, comprising a frame adapted to be mounted in front of an automobile radiator and having an opening and a flanged rim extending around said opening, an arm extending radially into said opening, a shaft carried by said arm, a plurality of foldable blades mounted on said shaft, the outer ends of said blades being adapted to engage the flanged rim of the frame, and means for holding the blades in their unfolded position.

4. A wind shield comprising a frame having an opening and an inner rim, a radially extending arm centered within said rim and provided with a pair of flanges extending in opposite directions, a shaft carried by the arm, two groups of foldable blades arranged on opposite sides of the arm and rotatable on the shaft, each of said groups being adapted to engage one of the arm-flanges and being provided with segmental slots of consecutively increasing length, and pins on the two flanking blades that engage the slots of the respective groups.

5. A wind shield comprising a frame having an opening, a shaft centered within said opening, a plurality of overlapping foldable blades mounted on said shaft, means for consecutively unfolding said blades, and a spring-pressed hoop engaging the blades and adapted to press the same against the frame.

6. A wind shield comprising a frame having an opening, an arm extending into said opening, a shaft journaled in the arm, a plurality of overlapping foldable blades mounted on the shaft, a resilient keeper adapted to engage the blades, and a spring-influenced hoop adapted to press the outer ends of the blades against the frame.

AUGUST HORMEL.

Witnesses:
Frank v. Briesen,
Katheryne Koch.